Dec. 14, 1943. B. N. PALM 2,336,799
RING-TYPE VARIABLE-SPEED TRANSMISSION
Filed March 24, 1942 4 Sheets-Sheet 1

INVENTOR.
BERNHARD N. PALM,
BY HARRIS, KIECH, FOSTER & HARRIS

ATTORNEYS.

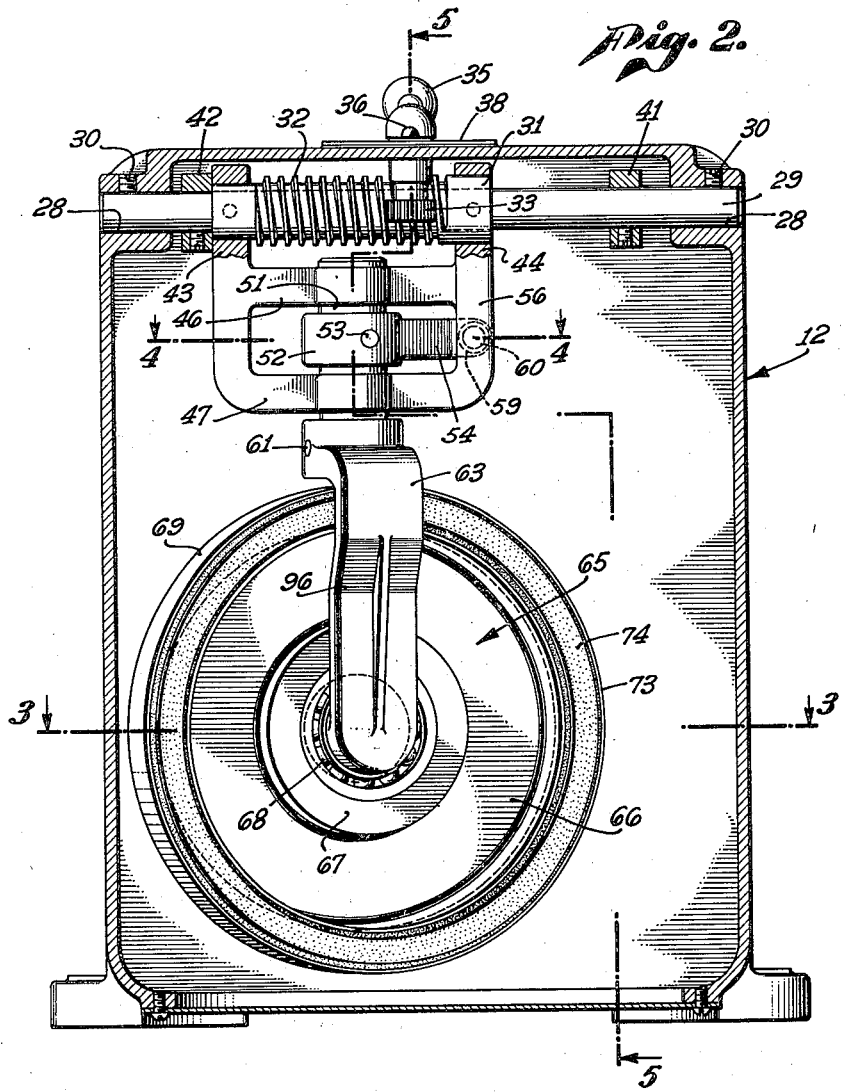
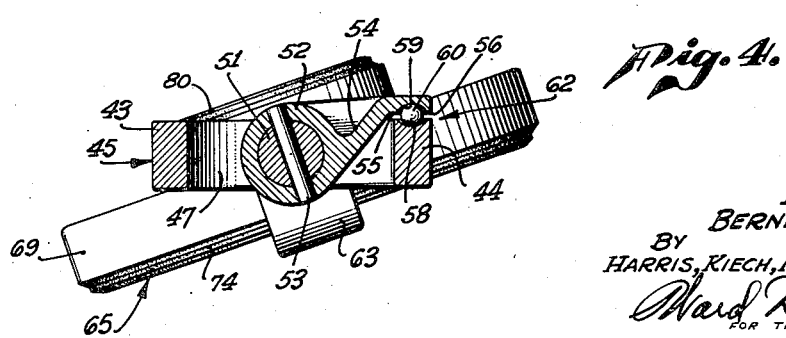

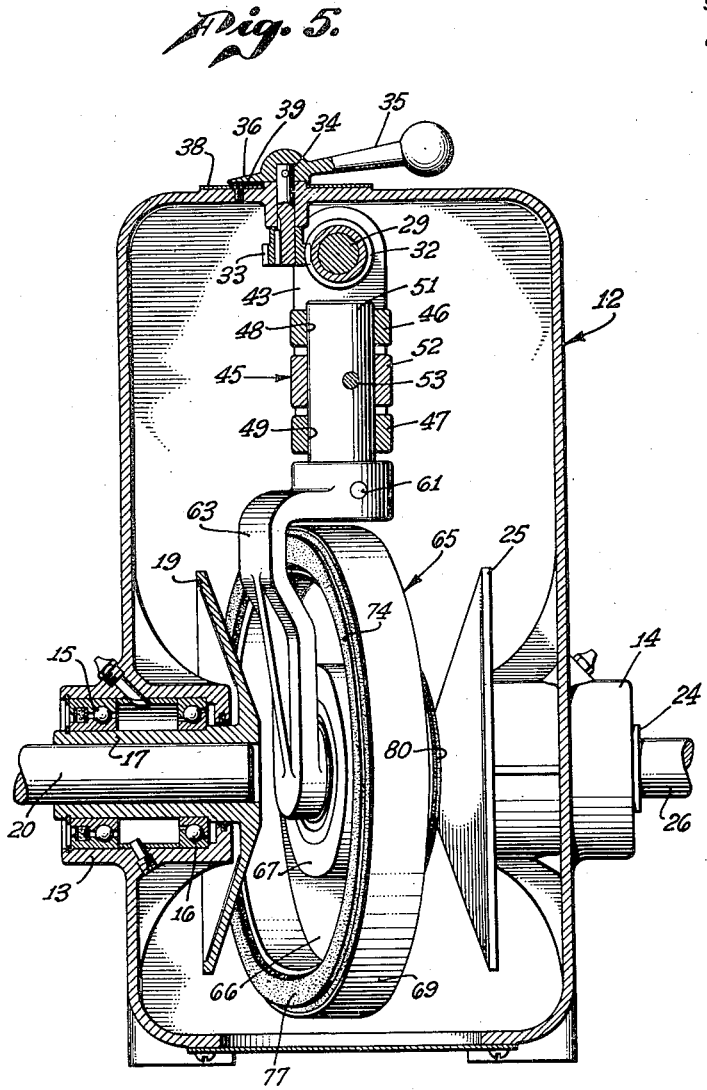
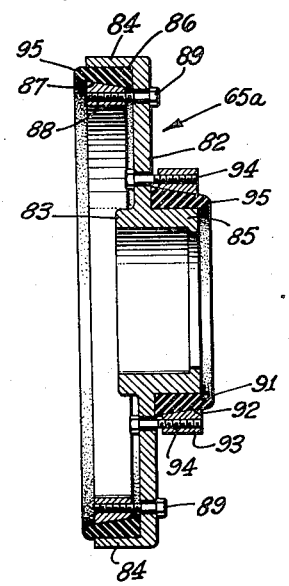
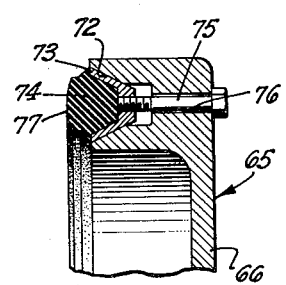

Dec. 14, 1943.　　　B. N. PALM　　　2,336,799
RING-TYPE VARIABLE-SPEED TRANSMISSION
Filed March 24, 1942　　　4 Sheets-Sheet 4
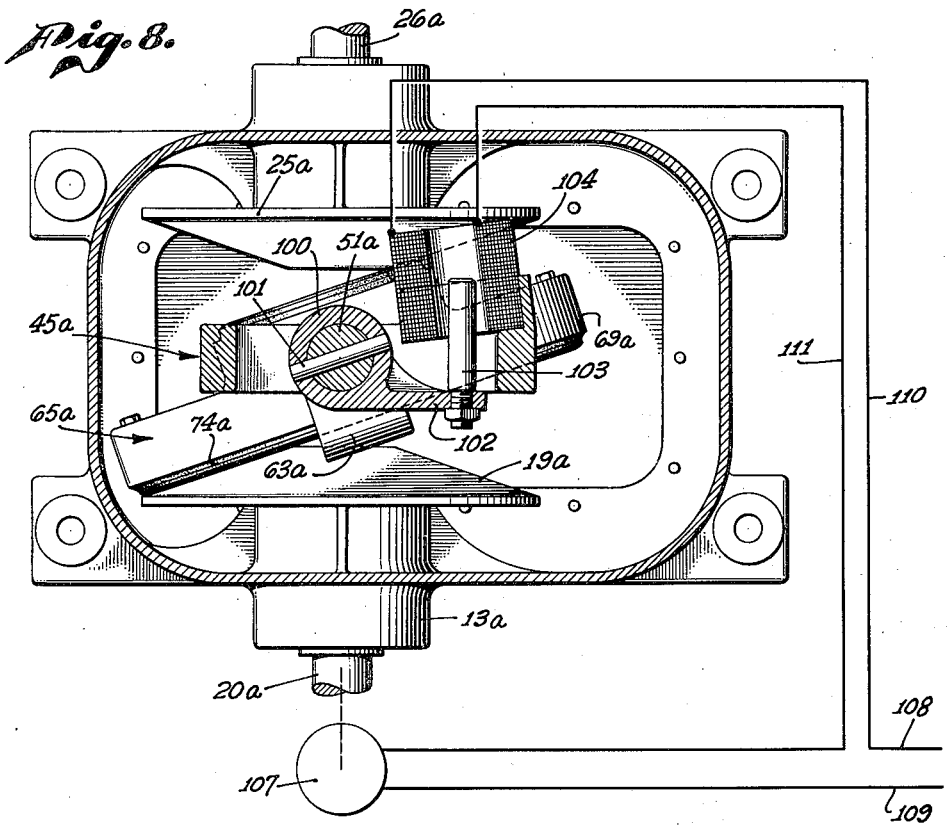
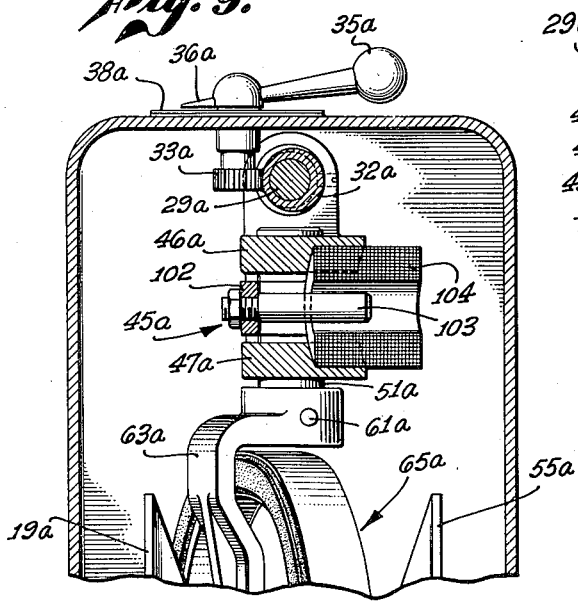
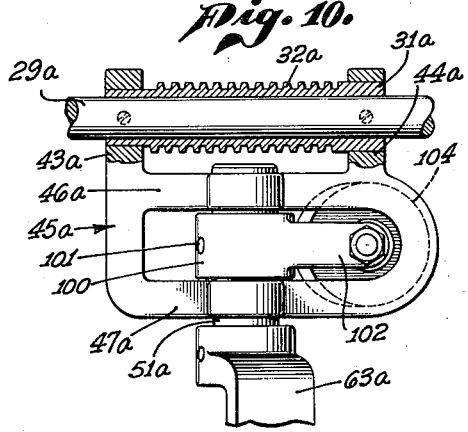
INVENTOR.
BERNHARD N. PALM,
BY
HARRIS, KIECH, FOSTER & HARRIS
ATTORNEYS.

Patented Dec. 14, 1943

2,336,799

UNITED STATES PATENT OFFICE 2,336,799

RING-TYPE VARIABLE-SPEED TRANSMISSION

Bernhard N. Palm, San Marino, Calif., assignor to Sterling Electric Motors, Inc., Los Angeles, Calif., a corporation of California Application March 24, 1942, Serial No. 435,964

15 Claims. (Cl. 74—193)

My invention relates to the variable-speed transmission art, and more particularly to a variable-speed transmission device including mechanism connecting two rotating shafts for varying the rotational speed of one relative to the other.

My invention is an improvement over the construction shown in a prior application by Carl E. Johnson, et al., Serial No. 387,042, filed April 5, 1941, to which reference is hereby made. Generally, said prior application discloses a variable-speed transmission having a drive shaft and a driven shaft and a plate member, such as a conical flange mounted on each of the shafts, and including a rotatable transmission ring mechanism engaging both of the plate members and adapted to transmit rotational movement of the drive shaft to the driven shaft, there being means provided for moving the transmission ring mechanism laterally relative to the plate members so as to vary the speed ratio between the drive and driven shafts.

In the use of such a variable-speed transmission the engagement pressure between the transmission ring and the plate members must be maintained as low as possible, without permitting slippage therebetween, so as to reduce to a minimum the frictional wear on both the transmission ring and the plate members. Since the torque load on such a device may frequently vary during actual use, either by a change in load on the driven shaft or a change in speed ratio between the shafts, it has hitherto been the practice to adjust the pressure of engagement between the transmission ring and the plate members to a value sufficiently high to prevent slippage therebetween when the device is carrying its maximum torque load. This has the disadvantage of maintaining the pressure of engagement at a uniformly high value even when the torque load decreases substantially and it is no longer necessary, with attendant unnecessary frictional wear on the transmission ring and the plate members.

It is therefore a primary object of my invention to provide such a variable-speed transmission in which the pressure of engagement between the transmission ring and the plate members varies in response to the load requirements of the device so that the pressure of engagement is at all times maintained only sufficient to carry the required load without slippage. By the use of my invention frictional wear between the transmission ring and the plate members is materially reduced, and repairs and replacements which would otherwise be required are rendered unnecessary.

In such a variable-speed transmission, when the torque load on the device is varied, there is a tendency of the transmission ring to move in a direction normal to the axis of the shafts. It is a further object of my invention to utilize this tendency of the transmission ring to move in response to load changes to actuate mechanism for accordingly varying the engagement pressure between the transmission ring and the plate members.

A further object of my invention is to provide such a variable-speed transmission including a torque-responsive mechanism adapted to vary the pressure of engagement between the transmission ring and the plate members in response to changes in current used by an electric motor connected in driving relation to the drive shaft of the transmission.

In a transmission such as is shown in said prior Johnson, et al., application, it is normally preferable to provide the transmission ring thereof with friction rings adapted to directly engage the plate members. Such friction rings are preferably made of rubber or other resilient material, and in some installations must be replaced at intervals due to wear thereon. A further object of my invention is to provide in such a transmission novel retaining means for such friction rings whereby the friction rings may be adequately secured to the transmission ring and yet readily removable therefrom.

Still another object of my invention is to provide a variable-speed transmission of the general type described above having a pair of axially aligned drive and driven shafts, each of the shafts having a conical flange thereon, a transmission ring between the flanges, and a rotatable control rod for bodily moving the transmission ring relative to the flanges to vary the speed ratio between the shafts, the control rod being disposed substantially normal to the axis of the shafts and the transmission ring being pivotally suspended from the control rod so that the transmission ring may swing through an arc as its position is adjusted relative to the flanges by the control rod. This construction is desirable in that it facilitates machining of the housing in which the control rod and shafts are supported.

Other objects and advantages will appear from the specification and drawings, in which:

Fig. 2 is a vertical sectional view taken on the line 2—2 of Fig. 1.

Fig. 4 is a fragmentary horizontal sectional view taken on the line 4—4 of Fig. 2.

Fig. 5 is a vertical sectional view taken on the line 5—5 of Fig. 2.

Fig. 6 is an enlarged fragmentary sectional view of one end of the transmission ring shown in the preceding figures.

Fig. 7 is a sectional view of an alternative form of the transmission ring of my invention.

Fig. 8 is a horizontal sectional view of my invention, diagrammatically showing an alternative form of torque-responsive control mechanism.

Fig. 9 is a fragmentary vertical view, partly in section, of the mechanism illustrated in Fig. 8.

Fig. 10 is a fragmentary end view, partly in section, of the mechanism shown in Fig. 8.

Figure 1:
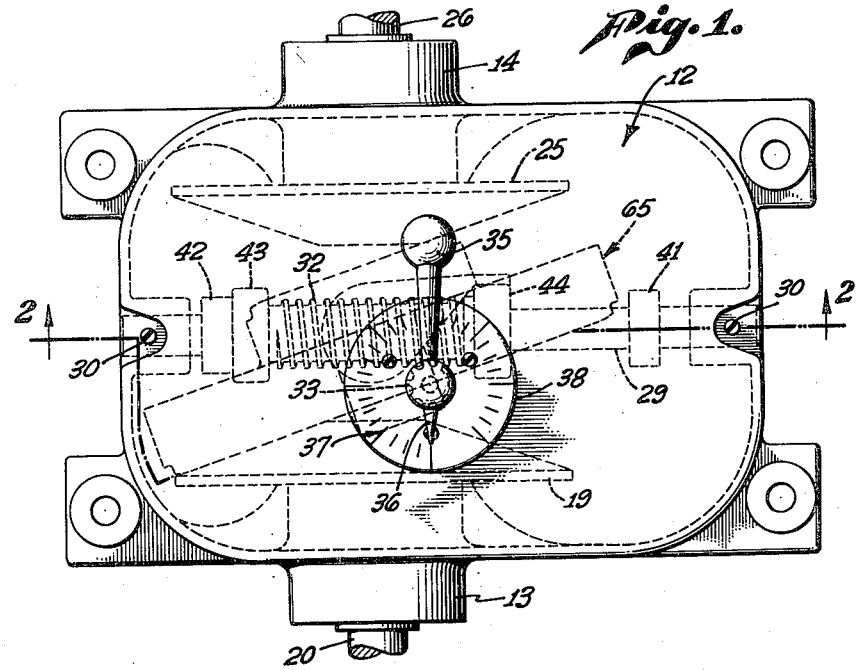
Fig. 1 is a plan view of my invention.

Referring to the drawings, Fig. 1 shows a housing 12 having a bearing flange 13 on one side thereof and a bearing flange 14 on the other side thereof. The bearing flange 13 is provided with an annular radial bearing 15 and an annular thrust bearing 16 which support a tubular sleeve 17, on the inner end of which is formed a conical flange or plate member 19. The tubular sleeve 17 receives the inner end of a drive shaft 20 which is suitably keyed to the sleeve, as by means of a key 21, so as to permit longitudinal movement of the drive shaft relative to the sleeve but preventing relative rotation therebetween.

The bearing flange 14 is similarly provided with a radial bearing 22 and a thrust bearing 23 which support a sleeve 24, on the inner end of which is formed a conical flange or plate member 25. The sleeve 24 is suitably keyed to a driven shaft 26 so as to permit longitudinal movement therebetween but preventing relative rotational movement. As will be understood, the drive shaft 20 and the driven shaft 26 may be reversed in position if desired.

Referring particularly to Figs. 2 and 5, the upper portion of the housing 12 is provided with aligned holes 28 which receive a supporting rod 29 preferably fixed relative to the housing as by setscrews 30. Disposed on the supporting rod 29 and adapted to slide axially thereon is a supporting sleeve 31 having a worm gear 32 formed on the central portion of its outer surface. Meshing with the worm gear 32 is a pinion 33 suitably fixed to the lower end of a pinion shaft 34, to the upper end of which is fixed an operating handle 35. Formed integrally with the hub of the operating handle 35, or fixed thereto, is a pointer 36 which is adapted to cooperate with a calibrated scale 37 formed on an indicator plate 38, the indicator plate being suitably secured to the housing 12, as by a screw 39. The calibrated scale 37 is preferably calibrated so as to indicate the relative speed ratio between the drive shaft 20 and the driven shaft 26, and may be graduated in terms of revolutions per minute of the driven shaft, or otherwise as desired. As will be understood, rotation of the operating handle 35 and the pinion 33 connected thereto causes axial movement of the supporting sleeve 31 on the supporting rod 29. Such movement is preferably limited by limiting stop blocks 41 and 42 suitably fixed to the supporting rod 29.

Fixed to the supporting sleeve 31 are vertical arms 43 and 44 of a supporting yoke 45 having horizontal cross arms 46 and 47. The cross arms 46 and 47 are provided with vertically aligned bores 48 and 49, respectively, which journal for rotation therein a pin member 51. Disposed on the pin member 51 between the cross arms 46 and 47 is a collar 52 which is suitably fixed to the pin member, as by a cross pin 53 extending therethrough, as best shown in Fig. 4. Formed on the collar 52 and extending outwardly therefrom is an arm member 54 which is provided with an end face 55 adapted to be disposed substantially parallel to the side face 56 of the vertical arm 44. Formed in the side face 56 of the vertical arm 44 is a semi-spherical pocket 58, and formed in the end face 55 of the arm member 54 is a semi-spherical pocket 59 oppositely disposed relative to the pocket 58. Received and retained in the pockets 58 and 59 is a ball 60, preferably formed of steel, which has a radius only slightly less than the radius of curvature of the pockets 58 and 59. The relation between the radius of curvature of the ball 60 and the radius of curvature of the pockets 58 and 59 is an important feature of the invention, as will be pointed out hereinafter.

Secured to the lower end of the pin member 51, as by a pin 61, is a supporting arm 63, preferably goose-necked in form, from the lower end of which projects a stub axle 64 adapted to rotatably support a ring means 65 of my invention. The ring means 65 includes an annular ring plate 66 having a central hub 67 supported for rotation on the stub axle 64 by radial bearings 68. The ring plate 66 is provided on one side with an outer annular flange 69, and on the other side with an inner annular flange 70 formed adjacent to or part of the hub 67.

Figure 3:
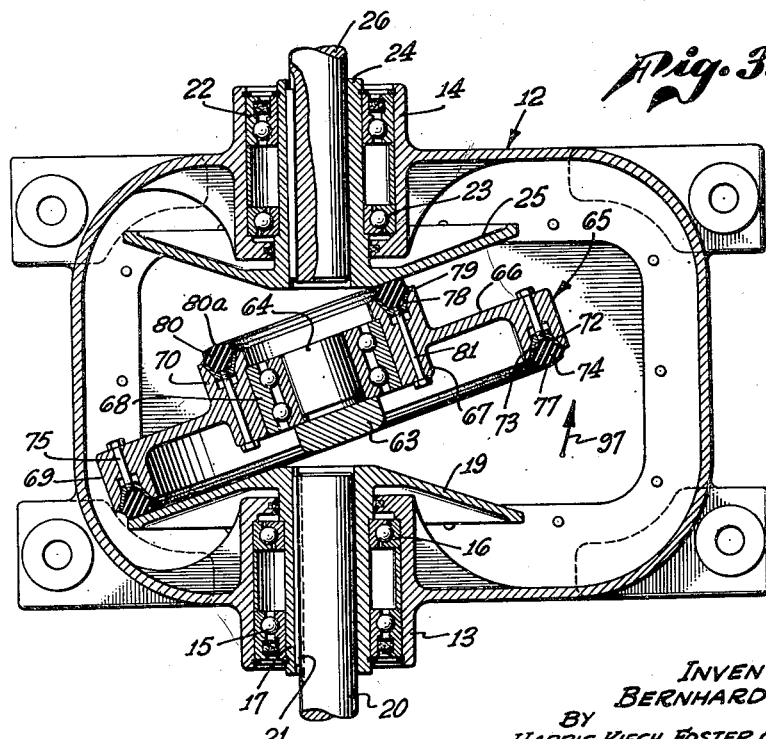
Fig. 3 is a horizontal sectional view taken on the line 3—3 of Fig. 2.

As best shown in Figs. 3 and 6, the outer annular flange 69 of the ring plate 66 is provided with an annular V-shaped groove 72 which receives an annular V-shaped retaining ring 73 having suitably fixed therein, as by bonding or otherwise, an annular friction ring 74. The friction ring 74 is preferably formed of a resilient material, such as rubber, having a relatively high coefficient of friction with the material of which the conical flange 19 is formed, although it is to be understood that the friction ring 74 may be formed of any suitable material without departing from the spirit of the invention. The retaining ring 73 is removably secured to the outer annular flange 69 by a plurality of circumferentially disposed bolts 75 which pass through suitable holes 76 formed in the flange and are threaded into the inner end of the retaining ring. As will be understood, by removal of the bolts 75 the retaining ring 73 and its friction ring 74 may readily be removed from the ring means 65 for replacement or repair, and this is a feature of the invention. As will be noted, the friction ring 74 is provided with a projecting, rounded engagement face 77.

The inner annular flange 70 of the ring plate 66 is similarly provided with an annular V-shaped groove 78 in which is disposed a retaining ring 79 having secured therein a friction ring 80, which is preferably similar to the friction ring 74 but smaller in diameter and is provided with a projecting, rounded engagement face 80a. The retaining ring 79 is secured to the inner flange 70 by circumferentially disposed bolts 81, which also may be removed readily to permit removal of the retaining ring 79 and the friction ring 80 for replacement or repair. As best shown in Fig. 3, the engagement face 77 of the friction ring 74 frictionally engages the inner face of the flange member 19, and the engagement face 80a of the friction ring 80 frictionally engages the inner face of the flange member 25.

Although I prefer to use the ring means 65 in the form just described, an alternative form thereof is illustrated in Fig. 7 and may be substituted therefor if desired. Referring to Fig. 7, a ring means 65a includes an annular ring plate 82 having a central hub 83 adapted to be supported on the radial bearing 68, as will be understood. The ring plate 82 is provided with a relatively thin outer annular flange 84 and a relatively thin inner annular flange 85, the flanges projecting in opposite directions from the sides of the ring plate. Abutting against the inner face of the outer flange 84 is a friction ring 86 having an inner beveled face 87 which is held in position by a clamping ring 88 secured to the ring plate 82 by circumferentially spaced removable bolts 89. Abutting against the outer face of the inner flange 85 is a friction ring 91 having an outer beveled face 92 and being secured in place by a clamping ring 93 secured to the ring plate 82 by circumferentially spaced bolts 94. The friction rings 86 and 91 are preferably formed of the same materials as described with relation to the friction ring 74, and, as will be noted, the friction rings 86 and 91 are similarly provided with rounded engaging faces 95. It will be understood that the ring means 65a may be substituted for the ring means 65 without alteration of the other features of construction.

In assembly, the parts are assembled so that the friction rings 74 and 80 of the ring means 65 frictionally engage, respectively, the inner faces of the flange members 19 and 25. As will be understood, the ring means 65 is supported for pivotal movement on a vertical axis defined by the pin member 51 which is journaled in the supporting yoke 45, and into and out of pressure engagement with the flange members 19 and 25. The ring means 65 is prevented from rotating out of frictional engagement with the flange members 19 and 25, in clockwise direction as seen in Figs. 3 and 4, by engagement of the arm member 54 with the ball 60, which in turn engages the vertical arm 44. By slightly increasing or decreasing the diameter of the ball 60, the normal minimum engagement pressure between the ring means 65 and the flange members 19 and 25 may be increased or decreased as desired.

In operation, as will be understood, the drive shaft 20 is connected to a suitable source of power, such as an electric motor (not shown), so as to rotate the same. Rotation of the drive shaft 20 causes a similar rotation of the tubular sleeve 17 keyed thereto and, since the inner face of the flange member 19 is frictionally engaged by the friction ring 74 of the ring means 65, the ring means 65 rotates on its stub axle 64 in the same direction as the flange member 19. Rotation of the ring means 65 rotates the flange member 25 in the same direction through frictional engagement of the friction ring 80 therewith to similarly rotate the sleeve 24 and the driven shaft 26 keyed thereto. As will be noted, the drive and driven shafts 20 and 26, respectively, thus rotate in the same direction, which is a desirable feature in many installations. As will also be understood, the driven shaft 26 is adapted to be operatively connected to a device to be driven (not shown), as is well known in the art. During operation, in the event that the transmission ring means 65 is rotated in a clockwise direction, as seen in Fig. 2, upon an increase in the torque load imposed on the driven shaft 26, the transmission ring means 65 will tend to move upwardly vertically in the direction indicated by the arrow 96 of Fig. 2. Such upward movement of the transmission ring means 65 is communicated through the supporting arm 63 and the pin member 51 to the collar 52 fixed to the pin member so as to tend to move the collar 52 and the arm member 54 thereof upwardly relative to the supporting yoke 45 and the vertical arm 44 thereof. As soon as such relative movement between the arm member 54 and the vertical arm 44 commences, however, the ball member 60 will tend to roll down the lower side of the semi-spherical pocket 58 and up the semi-spherical upper side of the pocket 59 to cause a wedging or cam action between the arm member 54 and the vertical arm 44, tending to separate the same. Since the supporting yoke 45 cannot rotate in response to this cam action exerted by the ball 60, the arm member 54 moves outwardly relative to the vertical arm 44 to rotate the collar 52 and the pin member 51 secured thereto in the bores 48 and 49 in the supporting yoke 45. Such rotation is communicated through the supporting arm 63 to the transmission ring means 65, which similarly rotates in the direction of the arrow 97, as shown in Fig. 3, to increase the pressure of engagement between the ring means 65 and the flange members 19 and 25. The device is so designed that the increase in engagement pressure between the ring means 65 and the flange members 19 and 25 is substantially proportional to the increase in torque load on the driven shaft 26 so that for any given increase in torque load on the driven shaft the increase in engagement pressure is sufficient to prevent slippage between the ring means 65 and the flange members 19 and 25.

If the device has been operating under a relatively high torque load imposed on the driven shaft 26, and this torque load decreases, the transmission ring means 65 will tend to drop back to its original position as shown in the drawings, in which case the semi-spherical pockets 58 and 59 move back into alignment, and the arm member 54, and consequently the transmission ring means 65, may then rotate in a clockwise direction, as seen in Fig. 3, about the pin member 51 to reduce the pressure of engagement between the transmission ring means and the flange members 19 and 25. Here again, the reduction in engagement pressure between the transmission ring means 65 and the flange members 19 and 25 is substantially proportional to the reduction in torque load on the driven shaft 26.

It will thus be appreciated that my invention provides a variable-speed transmission in which the engagement pressure between the transmission ring means 65 and the flanges 19 and 25 varies in proportion to the torque load imposed on the driven shaft 26 so as to maintain the engagement pressure only sufficient to prevent slippage between the transmission ring means and the flanges, to substantially reduce wear on the parts. It is also to be noted that this method of operation is accomplished regardless of the direction of rotation of the drive shaft 20. The operation has been described above for the case in which the drive shaft 20 is rotated so as to drive the transmission ring means 65 in a clockwise direction as seen in Fig. 2. If, however, the drive shaft 20 is rotated in the opposite direction so as to drive the transmission ring means 65 in a counterclockwise direction, as seen in Fig. 2, an increase in torque load on the driven shaft 26 will tend to cause the transmission ring 65 to move downwardly relative to the flange members, instead of upwardly as described above. In such case, the action of the ball member 60 in the semi-spherical pockets 58 and 59, which constitute cam or wedge means of the invention, similarly operates to separate the arm member 54 from the vertical arm 44. Hence, it will be seen that the direction of the rotation of the drive shaft 20 may be reversed at any time without changing the governing characteristics of the device so far as maintaining the engagement pressure of the ring means 65 with the flange members 19 and 25 at a correct and desired value is concerned.

As indicated above, the semi-spherical pockets 58 and 59 have a radius of curvature which is only slightly greater than the radius of the ball 60, which is a feature of the invention. This construction effectively limits the maximum engagement pressure that can be established between the transmission ring means 65 and the flanges 19 and 25, to prevent overloading of the friction rings 74 and 80 which, if formed of rubber or other similar resilient material, normally will not stand much overloading. The reason for this action is that upon relative vertical movement between the arm member 54 and the vertical arm 44 the ball member 60 will only roll a short way up the rather steeply inclined surfaces of the pockets so as to limit the wedging action derived therefrom. If shallow pockets or grooves were substituted for the semi-spherical pockets 58 and 59, the cam action would be amplified many fold and might establish an engagement pressure between the transmission ring means 65 and the flange members 19 and 25 higher than the breakdown point of the material of which the friction rings 74 and 80 are formed. By my construction, the engagement pressure is at all times maintained below a predetermined safe maximum.

It is also to be noted that the supporting rod 29 is disposed in a plane perpendicular to the axis of the aligned drive and driven shafts 20 and 26, respectively. This construction greatly simplifies manufacture of the device, as it permits all of the openings formed in the housing 12 to be readily drilled and machined on standard equipment without the repeated resetting and adjustment of the tools which would be required if the aligened holes 28 were required to be drilled at any other angle with respect to the axis of the drive and driven shafts. In this connection, it will also be observed that the transmission ring means 65 is pivotally suspended from the supporting rod 29 so as to be able to swing like a pendulum about the supporting rod as the ring means is moved axially relative thereto for adjustment of the speed ratio between the drive and driven shafts. Such a mounting of the transmission ring means 65 is necessary, since the ring means is not moved in its own plane, but at an angle thereto, and the transmission ring means must be free to swing as a pendulum about the supporting rod 29 as it is moved therealong to retain pressure engagement with the flange members 19 and 25. These features of construction are also features of my invention.

Figs. 8, 9, and 10 illustrate an alternative construction for controlling the engagement pressure between the transmission ring means and the conical flange members. Since the general construction shown in Figs. 8, 9, and 10 is identical with the construction shown in the preceding figures, similar reference numerals will be used with the suffix "a" appended thereto for convenience in understanding this alternative form of my invention. In this form of the invention, the transmission ring means 65a is carried by a supporting arm 63a which is fixed to the lower end of a vertical pin member 51a which is journaled for rotation in a supporting yoke 45a. In this form of the invention, however, the pin member 51a is held against vertical movement relative to the supporting yoke 45a by a collar 100 fixed to the pin member by a cross pin 101. As will be noted, the collar 100 is of sufficient thickness to prevent appreciable vertical movement of the pin member 51a relative to the supporting yoke 45a, there being a small clearance between the collar and the horizontal cross arms 46a and 47a. The collar 100 is provided with an arm member 102 having fixed to its outer end an armature 103 adapted to partially project into a solenoid coil 104.

As diagrammatically illustrated in Fig. 8, an electric motor 107 is provided and is adapted to be suitably connected to the drive shaft 20a, as is well known in the art. The motor 107 is supplied with electric current through connectors 108 and 109, the connector 109 being connected directly to the motor and the connector 108 being connected through a wire 110 to one end of the solenoid coil 104, the other end of which is connected through a connector 111 to the electric motor 107, so as to put the solenoid coil 104 electrically in series with the motor.

As will be understood, when the torque load imposed on the driven shaft 26a varies, the current required by the motor 107 also varies in proportion to the load, which varies the current flowing through the solenoid coil 104 with an attendant variation in the density of the flux path in the center of the coil. The magnetic field established by the solenoid coil 104 tends to draw the armature 103 into the coil, causing the collar 100 and the transmission ring mechanism 65a to rotate in a counterclockwise direction, as seen in Fig. 8, to increase the pressure of engagement of the transmission ring means 65a with the conical flanges 19a and 25a. Since the variations in current drawn by the electric motor 107 are substantially proportional to the torque load impressed on the driven shaft 26a, and since these variations in current vary the force exerted by the solenoid coil 104 on the armature 103, the pressure of engagement between the transmission ring means 65a and the conical flange members 19a and 25a will vary substantially proportionally to the torque load. It will thus be appreciated that the construction shown in Figs. 8, 9, and 10 accomplishes the same automatic control of engagement pressure of the ring means 65a as the control mechanism shown in the previous figures, but by a different mechanism which may be desirable in some installations.

Although I have shown and described a preferred embodiment of my invention, with several alternative constructions, it is to be understood that other elements and parts may be substituted for those disclosed herein without the exercise of invention and without departing from the spirit of my invention, and therefore I do not intend to be limited to the specific constructions shown and described herein but desire to be afforded the full scope of the following claims.

I claim as my invention:

1. In a variable-speed transmission, the combination of: a drive shaft; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means on a first axis which in turn causes rotation of said second plate member; means for pivotally supporting said ring means for pivotal movement about a second axis and into pressure engagement with said plate members; means for bodily moving said ring means while in pressure engagement with said plate members to vary the point of engagement of said ring means with at least one of said plate members so as to vary the rotational speed relation between said plate members; and means for automatically rotating said ring means about said second axis in response to changes in torque load on said ring means to change the pressure with which said ring means engages said plate members.

2. In a variable-speed transmission, the combination of: a drive shaft; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means on a first axis which in turn causes rotation of said second plate member; means for pivotally supporting said ring means for pivotal movement about a second axis and into pressure engagement with said plate members, said ring means tending to bodily move in the direction of said second axis in response to changes in torque load on said ring means; means for bodily moving said ring means while in pressure engagement with said plate members to vary the point of engagement of said ring means with at least one of said plate members so as to vary the rotational speed relation between said plate members; and means for rotating said ring means about said second axis in response to movement of said ring means in the direction of said second axis to change the pressure with which said ring means engages said plate members.

3. In a variable-speed transmission, the combination of: a drive shaft; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means on a first axis which in turn causes rotation of said second plate member; means for pivotally supporting said ring means for pivotal movement about a second axis and into pressure engagement with said plate members, said ring means tending to bodily move in the direction of said second axis in response to changes in torque load on said ring means; means for bodily moving said ring means while in pressure engagement with said plate members to vary the point of engagement of said ring means with at least one of said plate members so as to vary the rotational speed relation between said plate members; and cam means for rotating said ring means about said second axis in response to movement of said ring means in the direction of said second axis to change the pressure with which said ring means engages said plate members.

4. In a variable-speed transmission, the combination of: a drive shaft; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means on a first axis which in turn causes rotation of said second plate member; means for pivotally supporting said ring means for pivotal movement about a second axis and into pressure engagement with said plate members, said ring means tending to bodily move in the direction of said second axis in response to changes in torque load on said ring means; means for bodily moving said ring means while in pressure engagement with said plate members to vary the point of engagement of said ring means with at least one of said plate members so as to vary the rotational speed relation between said plate members; and cam means for rotating said ring means about said second axis in response to movement of said ring means in either direction along said second axis to change the pressure with which said ring means engages said plate members.

5. In a variable-speed transmission, the combination of: a drive shaft; a first conical flange member connected to said drive shaft and rotatable therewith; means for retaining said first flange rigidly against axial movement; a driven shaft; a second conical flange member connected to said driven shaft and rotatable therewith, the apexes of said flange members being adjacent each other; means for retaining said second flange rigidly against axial movement; rotatable ring means operatively engaging both of said flange members whereby rotation of said first flange member causes rotation of said ring means which in turn causes rotation of said second flange member; means for supporting said ring means for bodily movement relative to said flange members so as to change the points of engagement of said ring means with said flange members to change the rotational speed relation between said flange members; and means for automatically increasing the pressure of engagement between said ring means and said flange members in response to an increase in torque load on said ring means, and automatically decreasing said pressure in response to a decrease in said torque load.

6. In a variable-speed transmission, the combination of: a drive shaft; a first conical flange member connected to said drive shaft and rotatable therewith; means for retaining said first flange rigidly against axial movement; a driven shaft; a second conical flange member connected to said driven shaft and rotatable therewith, the apexes of said flange members being adjacent each other; means for retaining said second flange rigidly against axial movement; rotatable ring means operatively engaging both of said flange members whereby rotation of said first flange member causes rotation of said ring means which in turn causes rotation of said second flange member; a supporting arm adapted to support said ring means; supporting means for supporting said arm; means for moving said supporting means transverse to the axes of said shafts to bodily move said ring means relative to said flange members to change the rotational speed relation between said flange members; and means for automatically increasing the pressure of engagement between said ring means and said flange members in response to an increase in torque load on said ring means, and automatically decreasing said pressure in response to a decrease in said torque load.

7. In a variable-speed transmission, the combination of: a drive shaft; a first conical flange member connected to said drive shaft and rotatable therewith; means for retaining said first flange rigidly against axial movement; a driven shaft; a second conical flange member connected to said driven shaft and rotatable therewith, the apexes of said flange members being adjacent each other; means for retaining said second flange rigidly against axial movement; rotatable ring means operatively engaging both of said flange members whereby rotation of said first flange member causes rotation of said ring means which in turn causes rotation of said second flange member; a supporting arm adapted to support said ring means; an axially movable control rod adapted to support said supporting arm, said supporting arm being movable in response to axial movement of said control rod; means for axially moving said control rod; and means for automatically increasing the pressure of engagement between said ring means and said flange members in response to an increase in torque load on said ring means, and automatically decreasing said pressure in response to a decrease in said torque load.

8. In a variable-speed transmission, the combination of: an electric motor; a drive shaft operatively connected to said motor and driven thereby; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means which in turn causes rotation of said second plate member; means for supporting said ring means for bodily movement relative to said plate members so as to change the speed relation between said plate members; and means for automatically varying the pressure of engagement between said ring means and said plate members in response to changes in electrical load on said motor.

9. In a variable-speed transmission, the combination of: an electric motor; a drive shaft operatively connected to said motor and driven thereby; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means on a first axis which in turn causes rotation of said second plate member; means for pivotally supporting said ring means for pivotal movement about a second axis and into pressure engagement with said plate members; means for bodily moving said ring means while in pressure engagement with said plate members to move said ring means relative to said plate members so as to change the speed relation between said plate members; and means for rotating said ring means on said second axis in response to changes in the electrical load on said motor to vary the pressure of engagement between said ring means and said plate members.

10. In a variable-speed transmission, the combination of: a drive shaft; a first plate member connected to said drive shaft and rotatable therewith; a driven shaft, said shafts being axially aligned; a second plate member connected to said driven shaft and rotatable therewith; rotatable ring means operatively engaging both of said plate members whereby rotation of said first plate member causes rotation of said ring means which in turn causes rotation of said second plate member; a supporting rod disposed perpendicular to the axes of said shafts; supporting means for pivotally supporting said ring means on said supporting rod; and means for moving said supporting means along said supporting rod to bodily move said ring means relative to said plate members to vary the speed relation between said plate members, said supporting means being adapted for pivotal movement about said supporting rod as it moves therealong.

11. In a variable-speed transmission, the combination of: a drive shaft; a first plate member operatively connected to said drive shaft and rotatable therewith; a driven shaft; a second plate member operatively connected to said driven shaft and rotatable therewith; ring means disposed between said plate members and rotatable on a first axis; a first annular resilient friction ring adapted for frictional engagement with one of said plate members; a first retaining ring for retaining said first friction ring; a second annular resilient friction ring adapted for frictional engagement with the other of said plate members; a second retaining ring for retaining said second friction ring; means for removably securing said retaining rings on each side of said ring means; means for supporting said ring means for pivotal movement on a second axis so as to move said friction rings into frictional engagement with said plate members; and means for automatically rotating said ring means on said second axis in response to variations in load on said ring means to vary the pressure of engagement of said friction rings with said plate members.

12. In a variable-speed transmission, the combination of: a drive shaft; a first plate member operatively connected to said drive shaft and rotatable therewith; a driven shaft; a second plate member operatively connected to said driven shaft and rotatable therewith; ring means disposed between said plate members and rotatable on a first axis; a first annular resilient friction ring adapted for frictional engagement with one of said plate members; a first retaining ring for retaining said first friction ring; a second annular resilient friction ring adapted for frictional engagement with the other of said plate members; a second retaining ring for retaining said second friction ring; means for removably securing said retaining rings on each side of said ring means; means for supporting said ring means for pivotal movement on a second axis so as to move said friction rings into frictional engagement with said plate members, and for supporting said ring means for pivotal movement on a third axis so as to permit lateral movement of said ring means relative to said plate members; and means for automatically rotating said ring means on said second axis in response to variations in load on said ring means to vary the pressure of engagement of said friction rings with said plate members.

13. In a variable-speed transmission, the combination of: a drive shaft; a first conical flange member secured to said drive shaft; a driven shaft axially aligned with said drive shaft; a second conical flange member secured to said driven shaft, opposite sides of said flange members being parallel to each other; rotatable ring means disposed between said flange members and parallel to said sides, one side of said ring means engaging said first flange member and the other side of said ring means engaging said second flange member; a supporting rod secured in a plane normal to the axis of said shafts; supporting means for supporting said ring means on said supporting rod for movement along said supporting rod and for pivotal movement about the axis of said supporting rod; and means for moving said supporting means axially along said supporting rod to vary the rotational speed relation between said flange members.

14. In a variable-speed transmission, the combination of: a drive shaft; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means on a first axis which in turn causes rotation of said second plate member; means for pivotally supporting said ring means for pivotal movement about a second axis and into pressure engagement with said plate members, said ring means tending to bodily move in the direction of said second axis in response to changes in torque load on said ring means; means for bodily moving said ring means while in pressure engagement with said plate members to vary the point of engagement of said ring means with at least one of said plate members so as to vary the rotational speed relation between said plate members; and means for converting said movement of said ring means in the direction of said second axis into rotary movement of said ring means about said second axis to change the pressure with which said ring means engages said plate members.

15. In a variable-speed transmission, the combination of: an electric motor; a drive shaft operatively connected to said motor and driven thereby; a first plate member connected to said drive shaft and rotatable therewith; a driven shaft; a second plate member connected to said driven shaft and rotatable therewith; rotatable ring means operatively engaging both of said plate members whereby rotation of said first plate member causes rotation of said ring means which in turn causes rotation of said second plate member; means for supporting said ring means for bodily movement relative to said plate members so as to change the speed relation between said plate members; an armature element connected to said ring means; and solenoid means operatively connected to said armature and electrically connected to said motor so that a change in electrical load on said motor will cause said solenoid to move said armature to vary the pressure of engagement between said ring means and said plate members.

BERNHARD N. PALM.